United States Patent
Hahin et al.

(10) Patent No.: US 7,873,281 B2
(45) Date of Patent: *Jan. 18, 2011

(54) RELIABLE TRANSCEIVER MICROCODE UPDATE MECHANISM

(75) Inventors: Jayne C Hahin, Cupertino, CA (US); Gerald L Dybsetter, Scotts Valley, CA (US); Luke M Ekkizogloy, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 987 days.

This patent is subject to a terminal disclaimer.

(21) Appl. No.: 11/241,052

(22) Filed: Sep. 30, 2005

(65) Prior Publication Data

US 2006/0093366 A1   May 4, 2006

Related U.S. Application Data

(60) Provisional application No. 60/623,354, filed on Oct. 29, 2004.

(51) Int. Cl.
 *H04B 10/00* (2006.01)
 *H04B 10/08* (2006.01)
(52) U.S. Cl. .................. 398/135; 398/136; 398/22
(58) Field of Classification Search ............ 398/22, 398/135, 136
 See application file for complete search history.

(56) References Cited

U.S. PATENT DOCUMENTS 6,826,658 B1 * 11/2004 Gaither et al. ............ 711/150
7,107,414 B2 * 9/2006 Hidai et al. ............... 711/154
7,215,891 B1 * 5/2007 Chiang et al. ............. 398/137
2001/0054131 A1 * 12/2001 Alvarez et al. ............. 711/105
2004/0022537 A1   2/2004 Mecherle et al.
2006/0098699 A1 * 5/2006 Sanchez ..................... 372/26
2006/0285802 A1 * 12/2006 Fingler et al. ............... 385/88

* cited by examiner

*Primary Examiner*—Dalzid Singh
(74) *Attorney, Agent, or Firm*—Workman Nydegger

(57) ABSTRACT

A method for dynamically updating an optical transceiver (or optical transmitter or optical receiver) that has at least one processor, a persistent memory, and a microcode loader mechanism. The persistent memory includes microcode comprising instructions that, when executed by the at least one processor, control at least one component of the optical transceiver, transmitter, or receiver. In order to implement the invention, data is written to the persistent memory of the optical transceiver to indicate that an updating of microcode currently stored on the persistent memory is to occur. The optical transceiver processes received microcode, which contains instructions that are structured such that when executed by the at least one processor of the optical transceiver, the execution of the instructions affects the operation of the optical transceiver. Then, the processed representation of the received microcode is written to the persistent memory. The optical transceiver then determines that all of the microcode that is to be written to the persistent memory during the update has been written to the persistent memory. Finally, the persistent memory is altered to reflect that the update is complete.

20 Claims, 2 Drawing Sheets

RELIABLE TRANSCEIVER MICROCODE UPDATE MECHANISM

CROSS-REFERENCE TO RELATED APPLICATIONS

This application claims the benefit of U.S. Provisional Application No. 60/623,354, filed Oct. 29, 2004, which is incorporated herein by reference in its entirety.

BACKGROUND OF THE INVENTION

1. The Field of the Invention

The present invention relates generally to optical transmitters and receivers. More specifically, the present invention relates to optical transmitter and receivers that are capable of being updated with and running different versions of microcode to manage its operation.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. What would be advantageous are controllers that have more flexible functionality.

BRIEF SUMMARY OF THE INVENTION

The foregoing problems with the prior state of the art are overcome by the principles of the present invention, which relate to an optical transceiver (or optical transmitter or optical receiver) that has at least one processor, a persistent memory, and a microcode loader mechanism. The persistent memory includes microcode comprising instructions that, when executed by the at least one processor, control at least one component of the optical transceiver, transmitter, or receiver.

The principles of the present invention relate to a method for the optical transceiver to be dynamically updated. Specifically, data is written to the persistent memory of the optical transceiver to indicate that an updating of microcode currently stored on the persistent memory is to occur. The optical transceiver processes received microcode, which contains instructions that are structured such that when executed by the at least one processor of the optical transceiver, the execution of the instructions affects the operation of the optical transceiver. Then, the processed representation of the received microcode is written to the persistent memory. The optical transceiver then determines that all of the microcode that is to be written to the persistent memory during the update has been written to the persistent memory. Finally, the persistent memory is altered to reflect that the update is complete.

Accordingly, in order to change the functionality of the optical transceiver, the hardware of the optical transceiver need not change at all. Instead, different microcode is written to the persistent memory to implement the change in functionality. Loading different microcode into persistent memory is significantly more straightforward for a user than purchasing and setting up a different optical transceiver. Therefore, the principles of the present invention allow for more flexible operation for the optical transceiver at a greater convenience for the user.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a method for reliably updating microcode in an operational optical transceiver. The optical transceiver includes a processor and a persistent memory. Data is written to the persistent memory to indicate that a microcode update is to occur. New microcode is loaded into the optical transceiver. The processor processes the new microcode and writes it to the persistent memory. The processor then determines that the microcode update is complete. An example operational optical transceiver environment will first be described. Then, the operation in accordance with the invention will be described with respect to the operational environment.

Figure 1:
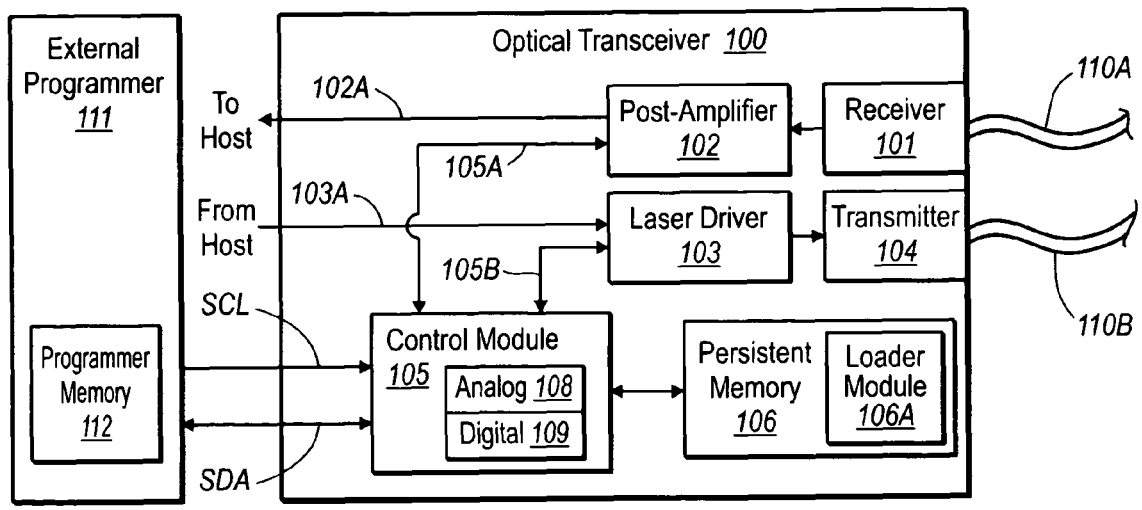
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 10G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host as represented by arrow 102A. The external host may be any computing system capable of communicating with the optical transceiver 100. In one embodiment, the optical transceiver 100 may be a printed circuit board or other components/chips within the host, although this is not required.

The optical transceiver 100 may also receive electrical signals from the host for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/ or the laser driver 103 as also represented by the arrows 105A and 105B. These settings adjustments are quite intermittent since they are only made when temperature or voltage or other low frequency changes so warrant.

The control module 105 may have access to a persistent memory 106, which in one embodiment is an Electrically Erasable and Programmable Read Only Memory (EEPROM). Persistent memory 106 may also be any other non-volatile memory source.

Data and clock signals may be provided from the host to the control module 105 using a serial clock line SCL, and a serial data line SDA. Also data may be provided from the control module 105 to the host using serial data line SDA to allow for digital diagnostics and readings of temperature levels, transmit/receiver power levels, and the like.

Figure 2:
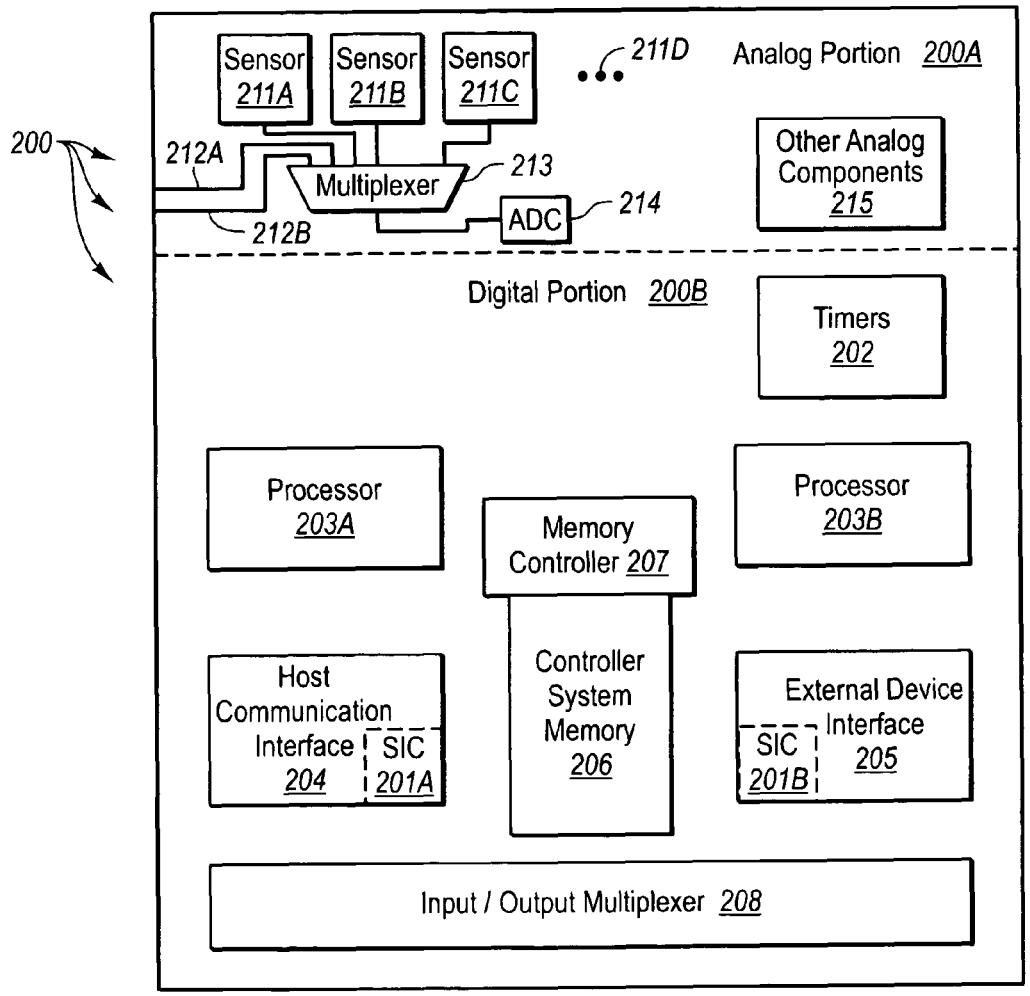
FIG. 2 schematically illustrates an example of the control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host using the serial data (SDA) and serial clock (SCL) lines of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I$^2$C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. For instance, the processors, memory and other components of FIGS. 1 and 2 may be implemented using a Field Programmable Gate Array (FPGA). Accordingly, the principles of the present invention relate to a method for reliably updating microcode in an operational optical transceiver. The principles of the present invention will be discussed with reference to the environment described in relation to FIGS. 1 and 2.

The principles of the present invention allow for a reliable method to update microcode in persistent memory. This method allows for a mechanism that quickly loads the new microcode and thus limits the amount of time the transceiver does not transmit. In addition, the transceiver module may not have to be removed from the host in order to program new microcode into the transceiver module. In the description and in the claims, "microcode" is defined to mean any type of operational or control code, such as, but not limited to, firmware and software, that runs on a microprocessor and controls the operation of the transceiver when executed.

Optical transceiver 100 includes a persistent memory 106, as noted previously. In some embodiments, persistent memory 106 may also include one or more write-protected memory locations that function as a transceiver loader module 106A. The transceiver loader module 106A may contain loader microcode. The loader microcode may include processor-executable instructions that, when executed by processors 203, cause optical transceiver 100 to perform certain update operations. Since the loader microcode in the transceiver loader module 106A is stored in a write-protected memory location, the loader microcode is not overwritten and may be available for execution every time that transceiver 100 is to have a microcode update. In other embodiments, the loader microcode may be stored in other, non write-protected memory locations in persistent memory 106.

The updating of microcode in persistent memory may be performed with a microcode loader mechanism. The microcode loader mechanism is configured to control the microcode update process. The microcode loader mechanism may be implemented in any number of ways, including the use of multiple hardware and/or software components. However, the basic operations of the microcode loader mechanism are as follows. The microcode loader mechanism writes data to the persistent memory of the optical transmitter to indicate that an updating of the microcode on the persistent memory is to occur. The microcode loader mechanism also receives updated microcode during a microcode update. The order in which the previous two steps occur is not fixed. In other words, it is possible to first receive the updated microcode, and then write data to the persistent memory to indicate that an updating of the microcode on the persistent memory is to occur. The microcode loader mechanism then writes the updated microcode to the persistent memory during the microcode update. Then, the microcode loader mechanism alters the persistent memory to reflect that the update is complete upon completion of the microcode update.

A specific embodiment of the present invention for implementing the microcode loader mechanism will now be described. In this embodiment, a transceiver loader module 106A is also included. This is by way of example only and should not be read to limit the claims. There may be numerous other embodiments of the present invention. As shown in FIG. 1, transceiver 100 may be communicatively coupled to an external programmer 111. External programmer 111 may be a transceiver host computing system or it may be some other computing system capable of providing new microcode to the optical transceiver 100. External programmer 111 may include a programmer memory 112, which may store a library of microcode structured such that, when executed by the transceiver processors, the microcode controls behavior of the transceiver 100. A keyboard or a mouse may be connected to external programmer 111 through use of a serial or parallel port to facilitate user control of external programmer 111 operational functions. External programmer 111 may also be equipped with a computer monitor or other display device.

A user may desire to update the microcode stored in persistent memory 106. The user may access transceiver 100 through use of external programmer 111. External programmer 111 may communicate with control module 105 using an interface protocol such as I$^2$C, shown in FIG. 1 by the SDA and SCL lines. Other interface protocols may also be used to for communication between external programmer 111 and control module 105.

The external programmer 111 may inform transceiver 100 that a microcode update is about to happen; or in other words, to indicate that an updating of microcode currently stored on the persistent memory is to occur. This may cause transceiver 100 to enter an update mode. In order to enter update mode, the transceiver 100 may write a flag (or other data) to the persistent memory 106 to indicate the update mode of operation.

Upon entering update mode, processors 203 may access the transceiver loader module 106A or another memory location in persistent memory 106 and load the loader microcode into controller system memory 206. The processors 203 may then execute the loader microcode. The executed loader microcode may cause transceiver 100 to perform update operations.

External programmer 111 may then provide the new microcode to be received by the transceiver 100. This new microcode may be from the library of microcode stored in programmer memory 112. Alternatively, external programmer 111 may be connected to a wide area network such as the internet and may be able to access the new microcode from a remote data site such as a World Wide Web page configured to allow user selection of desired microcode. Upon receiving the updated microcode, the transceiver provides the microcode into controller system memory 206. External programmer 111 may load the new microcode all at once or it may load the new microcode a section at a time.

For example, the executed loader microcode may cause control module 105 to process the new microcode by checking the new microcode being loaded into controller system memory 206 by external programmer 111. Host communication interface 204 may be configured to verify that the new microcode is expected microcode and is compatible with the microcode being implemented by transceiver 100. For example, the new microcode may contain the serial number of the optical transceiver in which the microcode is loaded. The host communication interface 204 may verify that the serial number in the new microcode matches the actual serial number of the optical transceiver. In this way it is verified that the new microcode is expected and compatible with the transceiver that has received the new microcode. Other processing may include, for example, decryption, decompression, or the like. In one embodiment, the processing may be no more than simply transferring the microcode from the controller system memory 206 to the persistent memory 106.

Processors 203 may then write the new microcode (or at least a processed representation thereof) received from external programmer 111 into persistent memory 106. The new microcode may be written a section at a time or it may be written all at once. The new microcode may overwrite the existing microcode stored in persistent memory 106. However, in some embodiments the new microcode may not be written to the write-protected memory locations comprising the transceiver loader module 106A. As discussed, the loader microcode stored in the transceiver loader module 106A is preserved so as be available for future microcode updates.

Control module 105 may then determine that all the microcode that is to be written to persistent memory 106 during the update process has been written. Once this loading operation is complete, processors 203 may then alter persistent memory to reflect that the update is complete. For example, the update mode flag may be deassert in persistent memory. Optionally, the loader module 106A may also notify the external programmer 111 that the update is complete.

If, on the other hand, the loader module 106A determines that there was some error in the loading process (e.g., not all of the microcode was received, there was a Cyclic Redundancy Check (CRC) error, or the like), the external programmer 111 may be informed that the microcode update was unsuccessful or incomplete. Also, suppose that during the microcode update process transceiver 100 was rebooted without having all the new microcode loaded into persistent memory 106. On reboot, external programmer 111 reads that the update mode flag is still asserted. This means that the update was not complete (or cannot be confirmed to be complete). The external programmer 111 may then be prompted to reinitiate the microcode update process discussed above.

On a successful and complete loading of the received microcode into persistent memory 106, microcode that does not require a reboot to become active may be immediately available, and microcode that requires a reboot will become active on the next reboot. In one embodiment, upon exiting the update mode by deasserting the update mode flag, the transceiver may be automatically configured to reboot.

The received microcode may be structured to perform a number of functions that differ from the functions of the microcode that was previously loaded into the persistent memory. For example, the received microcode may be structured to support a temperature compensation for a different range of temperatures as compared to the microcode that was previously stored on the persistent memory. This may be advantageous in that the temperature of an optical transceiver may affect the performance of various components within the optical transceiver. Therefore, loading microcode that supports a different range of temperatures may compensate for changes in component performance resulting from temperature. The range of temperatures supported by the received microcode may overlap the range of temperatures supported by the microcode that was previously stored on the persistent memory. Alternatively, the range of temperatures supported by the received microcode may be completely separate as compared to the range of temperatures supported by the microcode that was previously stored on the persistent memory. In addition, the received microcode may also be structured to fix or repair errors in the previous microcode stored on the persistent memory.

Similarly, the received microcode may be structured to support operations for a different range of receive power as compared to the microcode that was previously stored on the persistent memory. This may also be advantageous in that the power received by the optical transceiver may affect the performance of various components within the optical transceiver. Therefore, loading microcode that supports a different range of receive power may compensate for changes in component performance resulting from the level of receive power. The range of receive power supported by the received microcode may overlap the range of receive power supported by the microcode that was previously stored on the persistent memory. Alternatively, the range of receive power supported by the received microcode may be completely separate as compared to the range of receive power supported by the microcode that was previously stored on the persistent memory.

In one embodiment, the above disclosure is implemented within an optical transmitter instead of with an optical transceiver. In this embodiment, the receiver 101 and post-amplifier 102, along with the communication arrow 105A need not be included. This embodiment is advantageous where data need only be transmitted by the host, and not received. By eliminating components 101, 102, and 105A, the cost of manufacture is reduced, and the size of the optical transmitter will be reduced as compared to the size of an optical transceiver.

In another embodiment, the above disclosure is implemented within an optical receiver instead of with an optical transceiver. In this embodiment, the transmitter 104 and laser driver 103, along with the communication arrow 105B need not be included. This embodiment is advantageous where data need only be received by the host, and not transmitted. By eliminating components 103, 104, and 105B, the cost of manufacture is reduced, and the size of the optical receiver will be reduced as compared to the size of an optical transceiver.

Figure 3:
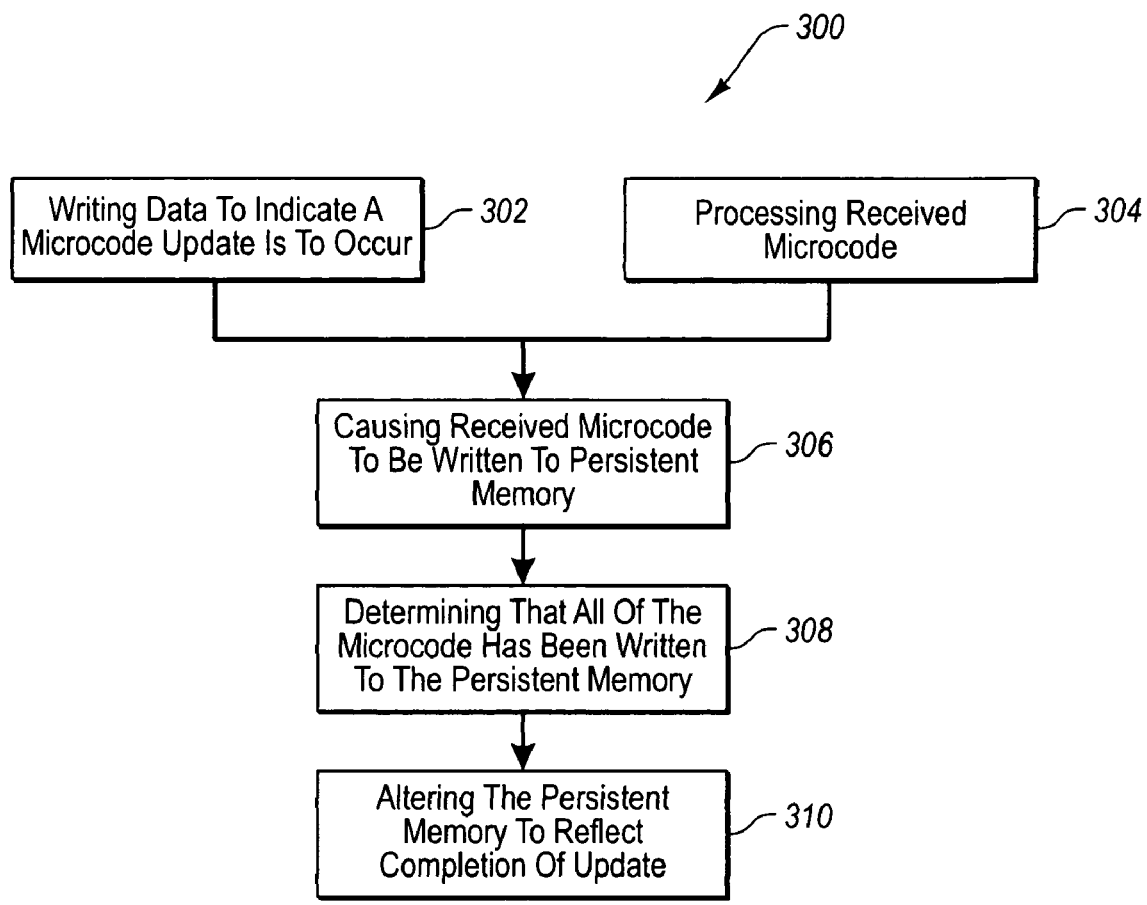
FIG. 3 illustrates a flowchart of a method for changing the functionality of the optical transceiver of FIG. 1 in accordance with the principles of the present invention.

Accordingly, as illustrated in FIG. 3, the principles of the present invention relate to a method 300 for dynamically updating an optical transceiver that includes at least one processor and a persistent memory. The method 300 may include an act of the optical transceiver writing 302 data to the persistent memory of the optical transceiver to indicate that an updating of microcode currently stored on the persistent memory is to occur. The method 300 may further include an act of the optical transceiver processing 304 received microcode containing instructions that are structured such that when executed by the at least one processor of the optical transceiver, the execution of the instructions affects the operation of the optical transceiver. The method 300 may further include an act of the optical transceiver causing 306 at least the processed representation of the received microcode to be written to the persistent memory. The method 300 may further include an act of the optical transceiver determining 308 that all of the microcode that is to be written to the persistent memory during the update has been written to the persistent memory. The method 300 may further include an act of the optical transceiver altering 310 persistent memory to reflect that the update is complete. As is illustrated in FIG. 3, steps 302 and 304 may occur in parallel, or one may occur after the other. Accordingly, the principles of the present invention are a significant advancement in the art of optical transceivers. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically updating an optical transceiver that includes at least one processor and a persistent memory, the method comprising the following:
    an act of the optical transceiver writing data to the persistent memory of the optical transceiver to indicate that an updating of microcode currently stored on the persistent memory is to occur;
    an act of the optical transceiver processing received microcode containing instructions that are structured such that when executed by the at least one processor of the optical transceiver, the execution of the instructions affects the operation of the optical transceiver, wherein the microcode includes operational or control code in the form of firmware and/or software that runs on the at least one processor and controls the operation of the optical transceiver when executed;
    an act of the optical transceiver causing at least the processed representation of the received microcode to be written to the persistent memory;
    an act of the optical transceiver determining that all of the microcode that is to be written to the persistent memory during the update has been written to the persistent memory; and
    an act of the optical transceiver altering persistent memory to reflect that the update is complete.

2. A method as recited in claim 1, wherein the received microcode is structured to support a temperature compensation for a different range of temperatures as compared to the microcode currently stored on the persistent memory.

3. A method as recited in claim 1, wherein the received microcode is structured to support operations for a different range of receive power as compared to the microcode currently stored on the persistent memory.

4. A method as recited in claim 1, further comprising: an act of the optical transceiver receiving microcode from a host computing system; and preventing the optical transmitter from transmitting while the microcode is executed by the one or more processors.

5. A method as recited in claim 4, wherein the received microcode is received from the host computing system over a network.

6. A method as recited in claim 4, wherein the received microcode is received from the host computing system over the Internet.

7. A method as recited in claim 1, wherein the act of the optical transceiver processing received microcode includes transferring the received microcode to the persistent memory.

8. A method as recited in claim 1, wherein the act of the optical transceiver processing received microcode includes decrypting the received microcode.

9. A method as recited in claim 1, wherein the act of the optical transceiver processing received microcode includes decompressing the received microcode.

10. An optical transmitter comprising:
    at least one processor;
    a persistent memory having thereon microcode comprising instructions that, when executed by the at least one processor, control at least one component of the optical transmitter, wherein the persistent memory is coupled to the at least one processor such that the processor may read and execute the microcode; and
    a microcode loader mechanism configured to perform the following:
        write data to the persistent memory of the optical transmitter to indicate that an updating of the microcode on the persistent memory is to occur;
        receive updated microcode, wherein the microcode includes operational or control code in the form of firmware and/or software that runs on the at least one processor and controls the operation of the optical transceiver when executed;
        write the updated microcode to the persistent memory during the microcode update; and
        alter the persistent memory to reflect that the update is complete upon completion of the microcode update.

11. An optical transmitter as recited in claim 10, wherein the updated microcode is structured to support a temperature compensation for a predetermined range of temperatures.

12. An optical transmitter as recited in claim 10, wherein the updated microcode is structured to support operations for a predetermined range of receive power.

13. An optical transmitter as recited in claim 10, further comprising an interface to a host computing system, wherein the host computing system sends the updated microcode to the optical transmitter.

14. An optical transmitter as recited in claim 13, wherein the updated microcode is received from the host computing system over a network.

15. An optical transmitter as recited in claim 13, wherein the updated microcode is received from the host computing system over the Internet.

16. An optical transmitter as recited in claim 10, wherein the persistent memory includes one or more write-protected memory locations.

17. An optical transmitter as recited in claim 10, wherein at least one of the write-protected memory locations stores a loader microcode for execution when the optical transceiver is to perform the microcode update.

18. An optical transmitter as recited in claim 10, wherein the optical transmitter is a portion of an optical transceiver.

19. An optical receiver comprising:

at least one processor;

a persistent memory having thereon microcode comprising instructions that, when executed by the at least one processor, control at least one component of the optical receiver, wherein the persistent memory is coupled to the at least one processor such that the processor may read and execute the microcode; and a microcode loader mechanism configured to perform the following:

write data to the persistent memory of the optical transmitter to indicate that an updating of the microcode on the persistent memory is to occur;

receive updated microcode, wherein the microcode includes operational or control code in the form of firmware and/or software that runs on the at least one processor and controls the operation of the optical transceiver when executed;

write the updated microcode to the persistent memory during the microcode update; and alter the persistent memory to reflect that the update is complete upon completion of the microcode update.

20. An optical receiver as recited in claim 19, further comprising: a system memory for storing the updated microcode upon the reception of the updated microcode, wherein during the microcode update, the updated microcode is read from the system memory and written to the persistent memory.

* * * * *